(12) United States Patent
Tsutsumi (10) Patent No.: US 7,726,856 B2
(45) Date of Patent: Jun. 1, 2010

(54) VEHICULAR MARKER LAMP

(75) Inventor: Yasuaki Tsutsumi, Shizouka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 168 days.

(21) Appl. No.: 11/827,707

(22) Filed: Jul. 13, 2007

(65) Prior Publication Data

US 2008/0013335 A1 Jan. 17, 2008

(30) Foreign Application Priority Data

Jul. 14, 2006 (JP) .............................. 2006-193836

(51) Int. Cl.
F21V 9/08 (2006.01)
B60Q 1/26 (2006.01)

(52) U.S. Cl. ...................... 362/510; 362/84; 362/231; 362/541

(58) Field of Classification Search ................. 362/84, 362/510, 231, 545, 541
See application file for complete search history.

(56) References Cited

U.S. PATENT DOCUMENTS

| | | | | |
|---|---|---|---|---|
| 4,794,494 A | * | 12/1988 | Reeder | 362/512 |
| 6,908,220 B2 | * | 6/2005 | Misawa et al. | 362/541 |
| 6,979,499 B2 | * | 12/2005 | Walck et al. | 428/690 |
| 7,061,454 B2 | * | 6/2006 | Sasuga et al. | 345/82 |
| 7,331,683 B2 | * | 2/2008 | Egashira et al. | 362/84 |
| 7,357,555 B2 | * | 4/2008 | Ouderkirk et al. | 362/609 |
| 7,575,349 B2 | * | 8/2009 | Bucher et al. | 362/503 |
| 2003/0170467 A1 | * | 9/2003 | Cornelius et al. | 428/447 |
| 2005/0253130 A1 | * | 11/2005 | Tsutsumi et al. | 257/13 |
| 2007/0133204 A1 | * | 6/2007 | Hulse et al. | 362/235 |
| 2008/0191620 A1 | * | 8/2008 | Moriyama et al. | 313/506 |

FOREIGN PATENT DOCUMENTS

JP  2001-110205  4/2001

* cited by examiner

*Primary Examiner*—Stephen F Husar
*Assistant Examiner*—Peggy A. Neils
(74) *Attorney, Agent, or Firm*—William L. Androlia; H. Henry Koda (57) ABSTRACT

A vehicular marker lamp including a lamp cover that contains nanosized fluorescent material and light sources that excite the fluorescent material so as to cause the lamp cover to emit colored light.

4 Claims, 8 Drawing Sheets

VEHICULAR MARKER LAMP

BACKGROUND OF THE INVENTION

1. Field of the Invention

The present invention relates to a vehicular marker lamp having a light-emitting module that emits red, amber and/or other colored light and constituting a rear combination lamp.

2. Description of the Related Art

On the back of a vehicle, a vehicular marker lamp, called a rear combination lamp, which combines together a red tail lamp and stop lamp, an amber turn lamp, and the like, is generally mounted. In a conventional rear combination lamp, lamp chambers are designed so that each chamber has a red- or amber-tinted lamp cover together with a white-light lamp bulb, and red or amber light is radiated to the exterior of the lamp by lighting the lamp bulb of the respective lamp chamber (see, for example, Japanese Patent Application Laid-Open (Kokai) No. 2001-110205, particularly pages 3 to 5 and FIG. 1 thereof).

However, in this conventional rear combination lamp, the lamp cover itself is tinted, and thus the red or amber color can be discerned even when the lamp is turned off. As a result, the lamp has a poor visibility problem especially when strong sunlight shines on the lamp cover and in like cases, and it is difficult to distinguish whether the light is on or is being emitted by the lamp bulbs or the sunlight is being reflected.

BRIEF SUMMARY OF THE INVENTION

Accordingly, it is an object of the present invention to improve the visibility of a marker lamp by making it possible to accurately distinguish between the state that colored light is being emitted when the lamp is turned on and lit and the state that the lamp is colorless when the lamp is tuned off and extinguished or when the sunlight is being reflected.

The above object is accomplished by a unique structure of the present invention for a maker lamp that includes a lamp cover which contains nanosized fluorescent material and light sources which excite the fluorescent material so as to cause the lamp cover to emit colored light. In this structure of the present invention, the lamp cover can be transparent because of the nanosized fluorescent material contained therein. As a result, it is possible to distinguish accurately between the state that the colored light is being emitted when the lamp is lit and the state that the lamp is colorless when the lamp is turned off or the sunlight is being reflected, thus improving the visibility of the lamp and safety. In addition, since the light cover itself emits light, the light emission area is enlarged and the visibility is improved compared with the method of conventional lamps in which the light sources emit lights that penetrate through the lamp cover.

In the present invention, the lamp cover can contain at least two types of fluorescent materials so that each one of the fluorescent materials is separately provided. The light sources are disposed inside a lamp chamber that is partitioned so that the separated regions include the respective fluorescent materials. In this structure, it is possible, for example, to provide lamp cover portions of two lamp chambers formed in the same rear combination lamp with a fluorescent material that emits red light and a fluorescent material that emits amber light, respectively, and by controlling the lighting and extinguishing of the light sources disposed in each lamp chamber, to control independently the emission of red light and amber light. Also, since the lamp cover is transparent, light reflected thereby is also transparent. Hence, it is possible to accurately distinguish the difference between a colored light emitting state of the lamp when the lamp is lit and a colorless light state of the lamp when the lamp is unlit or sunlight is being reflected by the lamp cover. The visibility of the lam thus improves.

In the present invention, the light sources emit lights of different characteristic wavelengths. Accordingly, even if, for instance, a fluorescent material that emits red light and a fluorescent material that emits amber light are blended in the same lamp cover or they are provided in proximate separated regions in the same lamp chamber, it is possible, by lighting only the light sources that excite the particular fluorescent material, to have red light or amber light emitted separately. Also, since the lamp cover is transparent, light reflected thereby is consequently transparent. Hence, it is possible to distinguish accurately between the state that the colored light is emitted when the lamp is lit and the state that the lamp is colorless when the lamp is extinguished (or unlit) or the sunlight is being reflected. The visibility of the lamp thus improves.

Furthermore, in the present invention, the lamp cover is provided with a region in which a mixture of different fluorescent materials is contained, and the light sources are disposed inside the lamp chamber that includes the entirety of such region. In this configuration, a mixture of the fluorescent material that emits red light and the fluorescent material that emits amber light is blended in a lamp cover portion of the lamp chamber formed in a rear combination lamp, and light sources for exciting the red light fluorescent material and other light sources for exciting the amber light fluorescent material are disposed inside the lamp chamber. By lighting one or the other set of light sources, it is possible to emit red light or amber light separately inside the same (single) lamp chamber. Also, since the lamp cover is transparent, light reflected thereby is transparent. Hence, it is possible to distinguish accurately between the state that colored light is emitted when the lamp is lit and the state that the lamp is colorless when the lamp is extinguished (or unlit) or the sunlight is being reflected. Thus, the visibility of the lamp improves.

In the present invention, the lamp cover can be coated with an ultraviolet ray absorbing coating layer. With such an ultraviolet ray absorbing coating layer, since the coating layer appropriately absorbs the ultraviolet rays of sunlight, emission of light from the fluorescent materials due to the sunlight is eliminated, and the lamp efficiently stands transparent and colorless when it is not lit.

Furthermore, in the present invention, the average particle size of the fluorescent material is 100 nm or smaller. With this average particle size of the fluorescent material, since the fluorescent material thus has an average particle size of 100 nm or smaller, which is one-fourth or less of the visible light (400 nm and over) is selected and used, visible light is allowed to penetrate through the lam cover without obstruction. The use of the fluorescent material having the average particle size of 100 nm or smaller is preferable for the sake of transparency.

As seen from the above, according to the present invention, the lamp has an improved visibility because it is possible to distinguish accurately the difference between the state that the colored light is emitted when the lamp is lit and the state that the lamp is colorless when the lamp is extinguished or the sunlight is being reflected thereby. Further, the present invention enhances the overall designability of the vehicle because the lamp cover is transparent and colorless and as a result it is possible to tint the inside of the transparent and colorless lamp cover (more specifically, the lamp chamber interior surfaces, reflector reflective surfaces and the like) so as to accord with the color of the vehicle body.

BRIEF DESCRIPTION OF THE SEVERAL VIEWS OF THE DRAWINGS

FIG. 4A is a side view, shown in a schematic illustration, of the region containing different fluorescent materials inside the lamp cover and the arrangement of the light sources, FIG. 4B being a front view thereof;

BRIEF DESCRIPTION OF THE SEVERAL VIEWS OF THE DRAWINGS

Figure 1:
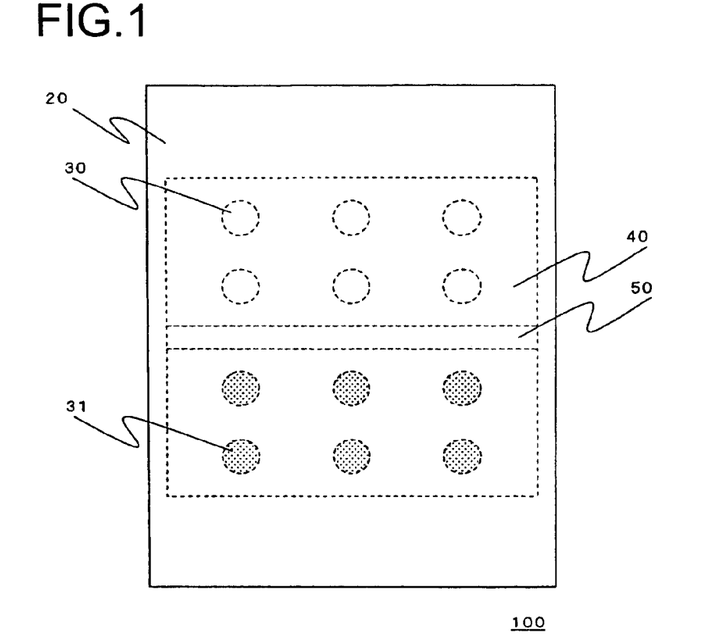
FIG. 1 is a schematic front view of the rear combination lamp according to the first embodiment of the present invention.
Figure 2:
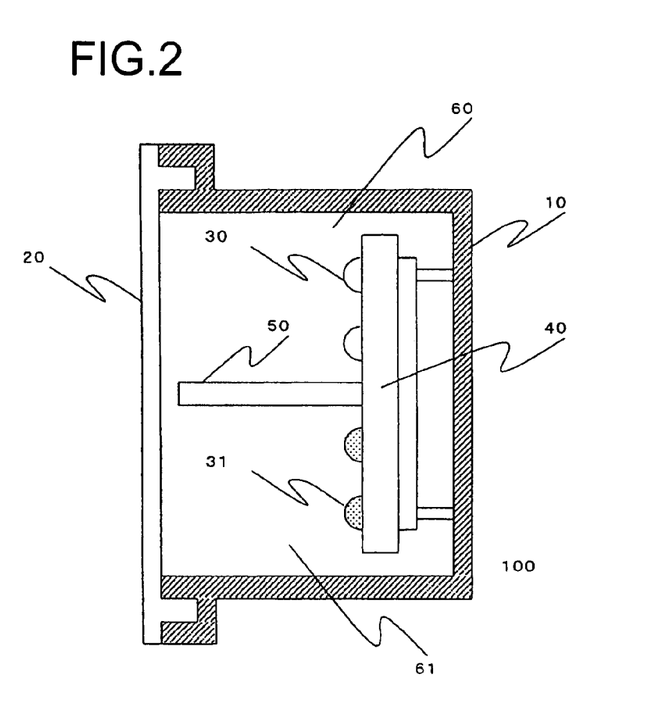
FIG. 2 is a schematic longitudinal cross-sectional view thereof.

FIG. 1 illustrates a rear combination lamp of the first embodiment of the present invention, and FIG. 2 is a longitudinal cross-sectional view thereof. The rear combination lamp 100 is composed mainly of a housing 10, a lamp cover (lens) 20, light sources 30 and 31, a base plate 40 that is joined to the housing and is provided with the light sources thereon, a partition wall 50 that extends perpendicularly from the surface of the base plate and partitions the lamp chamber into an upper section and lower section, and lamp chambers 60 and 61 that are formed (separated) by the partition wall.

The lamp cover 20 is formed from transparent synthetic resin or the like. As will be described below, particular regions in the interior part thereof contain fluorescent material; and in the shown embodiment, the fluorescent material contained in the lamp cover 20 emits red light or amber light. In this embodiment, the light sources 30 are disposed inside the upper lamp chamber 60 formed in the upper section by the partition wall 50, and the light sources 31 are provided in the lower lamp chamber 61 formed in the lower section of the combination lamp 100.

The light sources 30 and 31 are luminous bodies formed from semiconductor light-emitting elements or the like, and they are able to emit light of a characteristic wavelength that excites the particular fluorescent material and causes it to emit light. However, the light sources 30 and 31 are not limited to semiconductor light-emitting elements, and they can be of any type that can be used provided that the light sources are able to excite the fluorescent material and cause it to emit light. In addition, there is no limitation to the number of light sources, and they can be arranged vertically or horizontally

Figure 3:
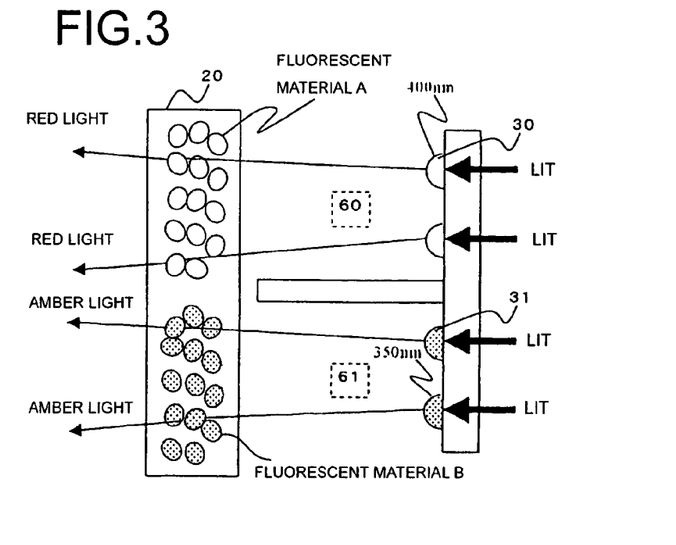
FIG. 3 schematically illustrates the relation among the region that contains different fluorescent materials inside the lamp cover, the arrangement of light sources and the emission colors (red light and amber light) in the rear combination lamp of the first embodiment of the present invention.

The relation between the lamp cover and the light sources will now be described below in detail. FIG. 3 schematically shows the relationship among the regions that contain the fluorescent material inside the lamp cover, the arrangement of the light sources, and the colors of lights emitted by the rear combination lamp of the first embodiment of the present invention.

As seen from FIG. 3, in the rear combination lamp of the first embodiment, red light emitting fluorescent material A is blended (or provided) in the region of the lamp cover 20 that corresponds to (or faces) the upper lamp chamber 60, and amber light emitting fluorescent material B is blended (or provided) in the region of the lamp cover 20 that corresponds to (or faces) the lower lamp chamber 61. These upper and lower lamp chambers are, as described above, formed by the partition wall 50 that divides the inside of the lamp 100 into two sections. In addition, the light sources 30 are disposed inside the upper lamp chamber 60, and they emit light that has a main wavelength peak of 400 nm and effectively excite the fluorescent material A; and the light sources 31 are disposed inside the lower lamp chamber 61, and they emit light that has a main wavelength peak of 350 nm and effectively excite the fluorescent material B.

In the shown embodiment, $Y_2O_3$:Eu is used as the fluorescent material A so that by directing 400 nm exciting light from the light sources 30, red light with stable emission characteristics is produced by the fluorescent material A.

On the other hand, with a use of $Y_2O_3$:Dy for the fluorescent material B and by directing 350 nm exciting light from the light sources 31, amber light with stable emission characteristics is produced by the fluorescent material B.

The fluorescent material B used in the first embodiment of the present invention can be shown by the general formula:

$$Me_xSi_{12-(m+n)}Al_{(m+n)}OnN_{16-n}:Eu^{2+}_y$$

(where: Me is one or more from among Li, Ca, Mg, Y, and a lanthanide metal other than La, Ce and Eu; and x, y, m and n are all positive numbers.)

It will alternatively be possible to use a compound with the characteristics that Me is Ca, and that $0.6 \leq x \leq 1.2$, $1.2 \leq m \leq 2.4$, $0.1 \; n \leq 2.4$, and $0.0001 \leq y \leq 0.1$ in the above general formula. By directing 350 nm exciting light from the light sources 31 at such a compound, amber light with stable emission characteristics can be produced.

As long as the lamp cover with the fluorescent materials A and B provided therein is transparent, it does not matter what particle shape or particle size the fluorescent materials A and B have or what type of surface treatment the lamp cover is applied to. The term "transparent" used herein refers to the case that the transmittance ratio of the light of wavelengths other than those that excite the fluorescent materials exceeds 70%. More specifically, the light can be of any wavelength provided that it is in the visible range of 550 to 800 nm. The method of blending in (combining) the fluorescent material can be of any desired manner. The fluorescent material can, for example, be mixed into the thermoplastic resin of which the transparent lamp cover is constituted, or it can be dispersed in water, alcohol or other solvent, or in acrylic, epoxy, urethane or other resin, to make a liquid that is applied as a coating to a lamp cover that contains no fluorescent materials.

The average particle size of the fluorescent material is subject to no particular restriction, but in the interest of transparency, the average particle size is preferably no more than 100 nm. The average particle size of the fluorescent material can be measured using well-known methods. For example, it can be measured by means of laser diffraction scattering, a differential mobility analyzer (DMA), dynamic light scattering, a transmission electron microscope (TEM), a scanning electron microscope (SEM), or X-ray diffraction. Since it (measurement) involves observation in a solid situation, the average particle size of the fluorescent material in the lamp cover is preferably measured by a transmission electron microscope.

An ultraviolet ray absorbing coating layer is preferably provided on the outer side of the fluorescent material layer of the lamp cover 20 of the present invention; in other words, an ultraviolet ray absorbing coating layer can be applied on the "sun-side" of the lamp cover 20. The ultraviolet ray absorbing coating layer can be provided by any desired manner. For example, the ultraviolet ray absorbing coating material can be coated on the outer side of the lamp cover 20. Alternatively, the ultraviolet ray absorbing coating material can be mixed into a thermoplastic resin of which the lamp cover is formed, and after the formation of the lamp cover 20, a coating that contains the fluorescent material dispersed therein is applied to the inner surface of the lamp cover.

In the rear combination lamp 100 with fluorescent material of the above-described composition blended into the lamp cover 20 of the above configuration, as shown in FIG. 3, the upper section of the lamp cover 20 emits red light when only the light sources 30 are lit. When on the other hand only the light sources 31 are lit, the lower section of the lamp cover 20 emits amber light. Also, since the lamp chamber is divided into upper and lower sections by the partition wall 50, both red and amber lights are emitted when both light sources 30 and 31 are lit. Thus, in the rear combination lamp of this embodiment, lighting and extinguishing (or lighting on and off) of red and amber lights can be controlled independently.

Figures 4A, 4B:
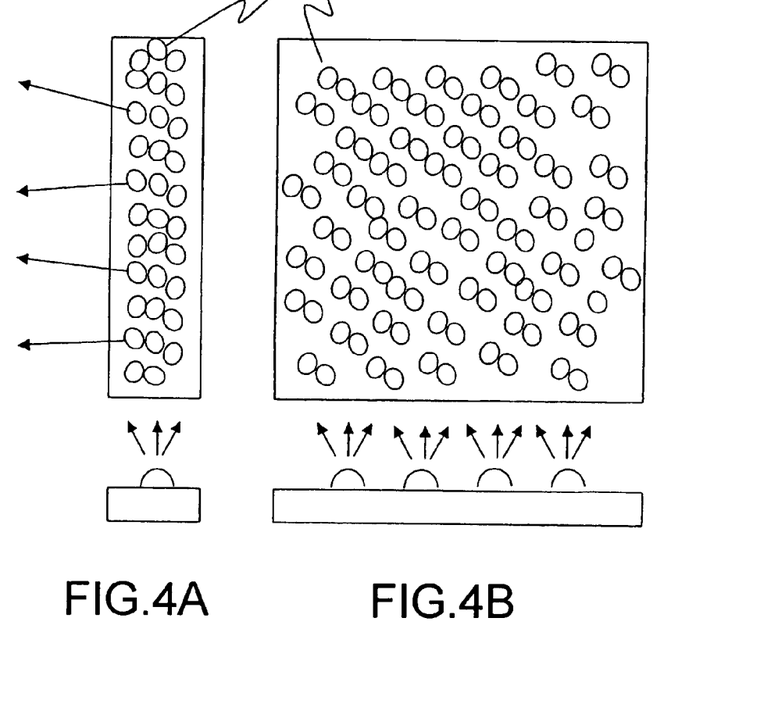

In FIG. 3, the light sources are provided so as to radiate the exciting lights from the back surface of the lamp cover 20; however, the light sources can alternatively be disposed along the side surface of the lamp cover 20 as shown in FIGS. 4A and 4B (where the light sources are provided below the lamp cover 20). FIGS. 4A and 4B illustrate a configuration where the exciting lights from the light sources are radiated into the lamp cover that contains a single type of fluorescent material. However, when the lamp cover contains multiple types of fluorescent materials, light sources that radiate excitation lights corresponding to each fluorescent material can be disposed on the lateral surface side of the lamp cover.

Figure 5:
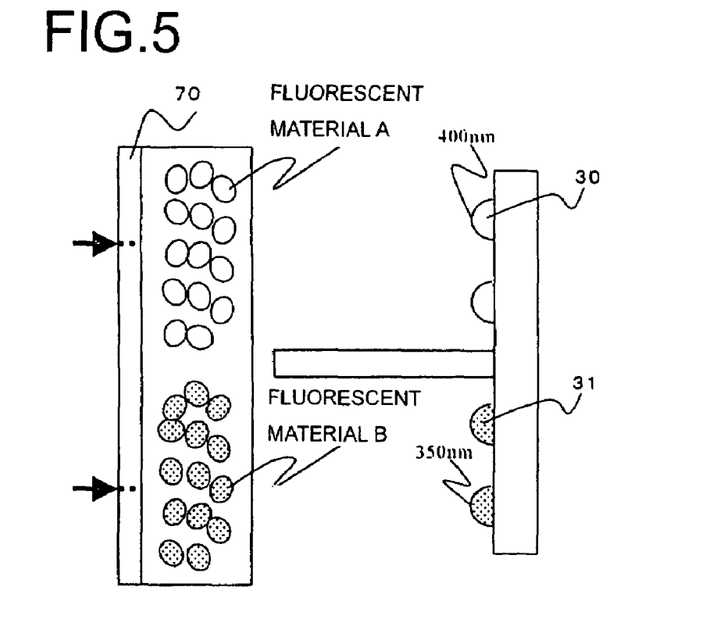
FIG. 5 is a schematic longitudinal cross-sectional view of the rear combination lamp of the present invention in which an ultraviolet ray absorbing coating is applied to the outer surface of the lamp cover.

FIG. 5 is a schematic view (longitudinal cross-sectional view) showing the configuration of the rear combination lamp in which an ultraviolet ray absorbing coating 70 is applied to the outer surface of the lamp cover 20. Since the coating layer 70 absorbs the ultraviolet rays of sunlight, deterioration in the quality of the fluorescent material in the lamp cover 20 can be appropriately reduced.

Figure 6:
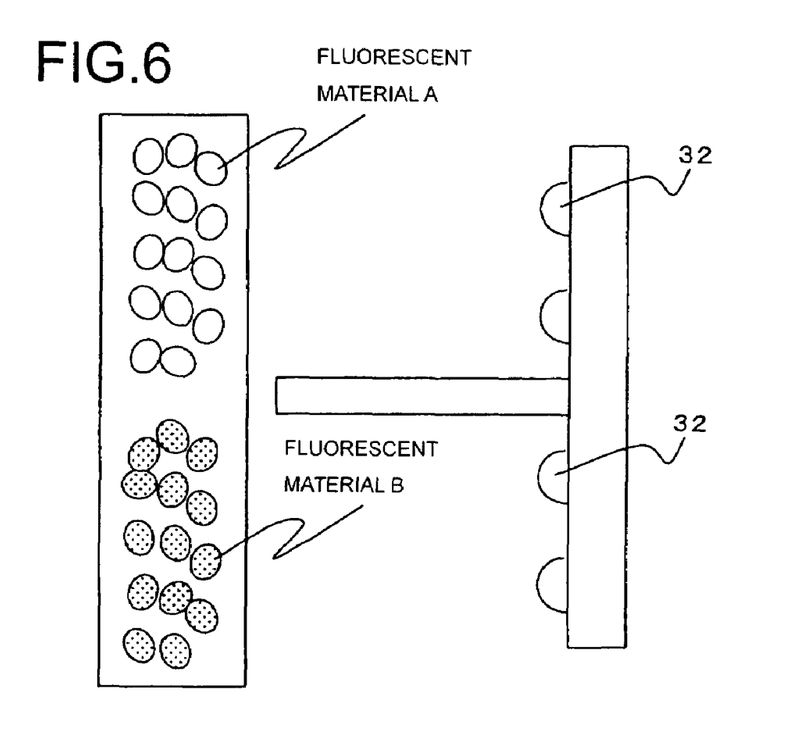
FIG. 6 is a schematic longitudinal cross-sectional view of the rear combination lamp of the first embodiment of the present invention wherein the same light sources are used in the upper and lower lamp chambers of the lamp.

In the rear combination lamp 100 of the first embodiment, lamp chambers are provided in a quantity corresponding to the types of fluorescent material (in this embodiment, two types, A and B) and are separate from each other. Therefore, the light sources, provided that they emit lights of wavelength that effectively excite each fluorescent material, can all consist of light sources 32 as shown in FIG. 6.

According to the vehicular marker lamp of the first embodiment, thanks to the appropriate combination of the light sources and the fluorescent materials that are provided in the lamp cover, it is possible to distinguish accurately between the state that colored light is emitted when the lamp is lit and the state that the lamp is colorless when the lamp is extinguished (or unlit) or when the sunlight is being reflected by the lamp cover. Thus, the visibility of the maker lamp is high.

Figure 7:
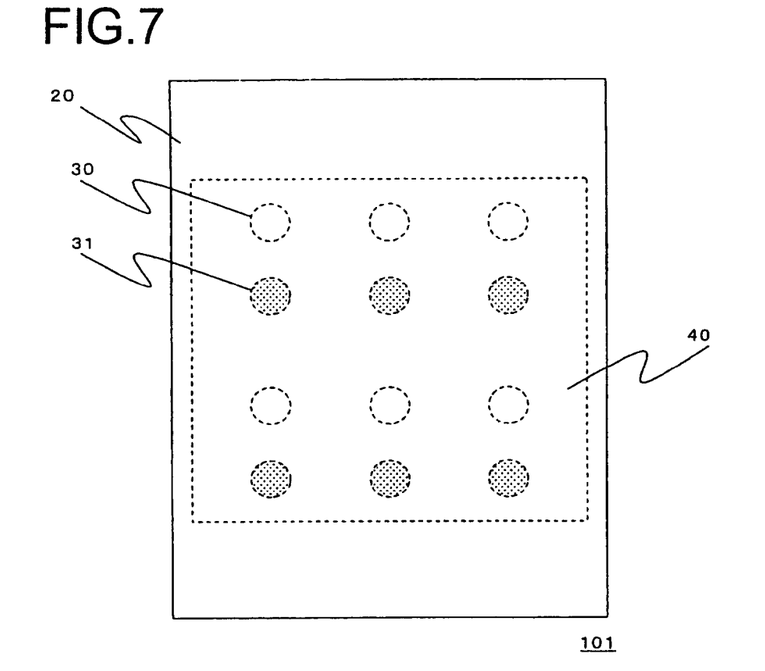
FIG. 7 is a schematic front view of the rear combination lamp according to the second embodiment of the present invention.
Figure 8:
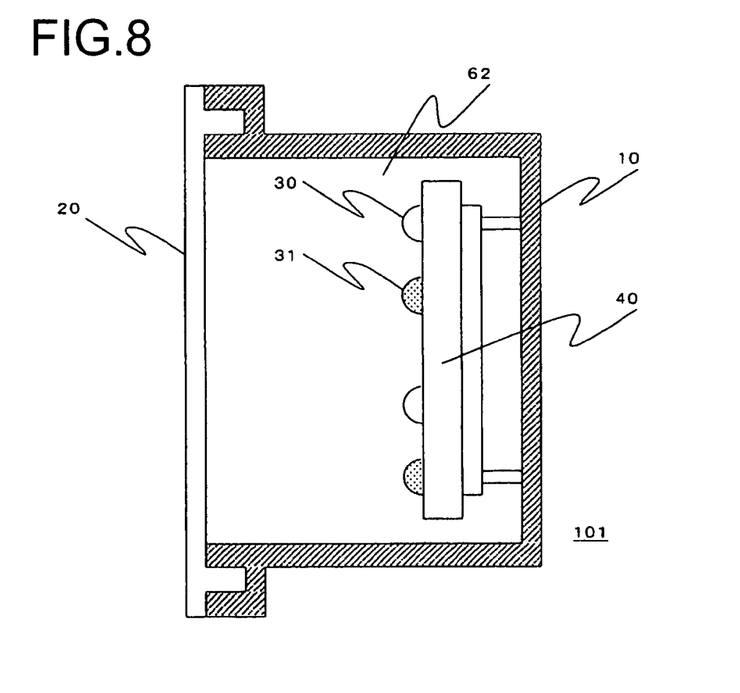
FIG. 8 is a schematic longitudinal cross-sectional view thereof.

FIG. 7 shows in a schematic view (front view) the rear combination lamp according to the second embodiment of the present invention, and FIG. 8 is a longitudinal cross-sectional view thereof.

Compared with the first embodiment, the rear combination lamp 101 of the second embodiment differs from the first embodiment in that the rear combination lamp 101 has no partition wall 50 that divides the lamp chamber into upper and lower sections. Because there is no partition wall 50, the rear combination lamp 101 has a single large lamp chamber 62, and the light sources 30 and 31 are disposed in the same lamp chamber. The rest of the structure is the same as that of the first embodiment, and the descriptions thereof are therefore omitted.

The light sources 30 and 31 of the rear combination lamp 101 of the second embodiment are luminous bodies formed from semiconductor light-emitting elements or the like and able to radiate light of a characteristic wavelength that excites the particular fluorescent material and causes it to emit light. However, they are not limited to semiconductor light-emitting elements, and any type of light source can be used provided that the light source is able to excite the fluorescent material and cause it to emit light. Obviously, there is no limitation to the number of light sources that are disposed laterally or horizontally.

Figure 9:
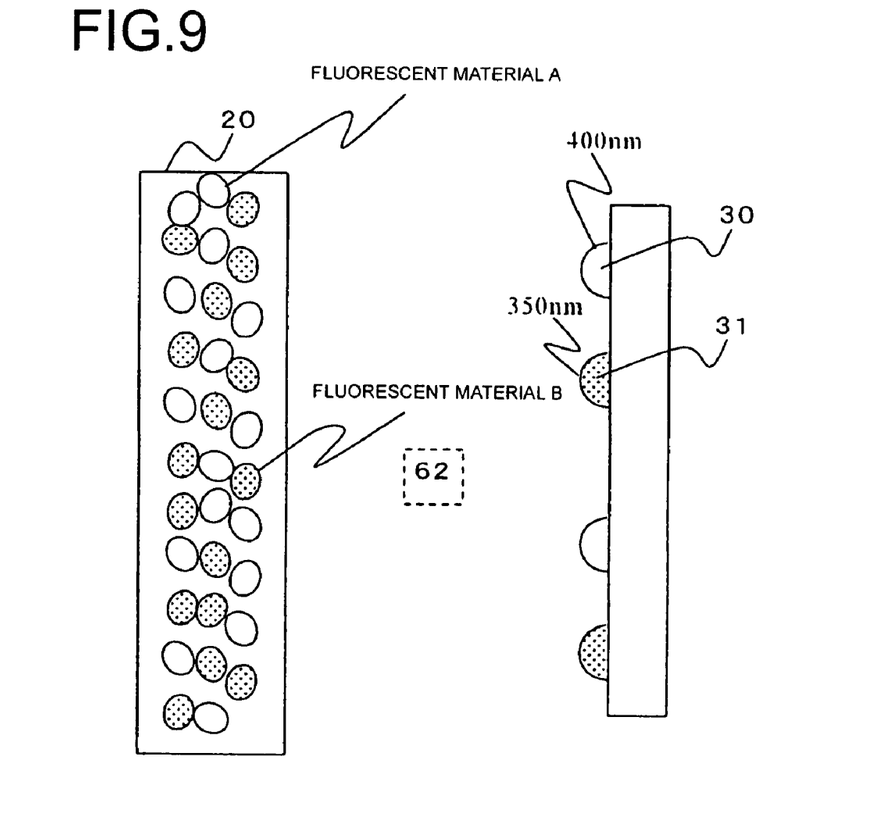
FIG. 9 schematically illustrates the relation between the region that contains different fluorescent materials inside the lamp cover and the arrangement of light sources in the rear combination lamp of the second embodiment of the present invention.
Figure 10:
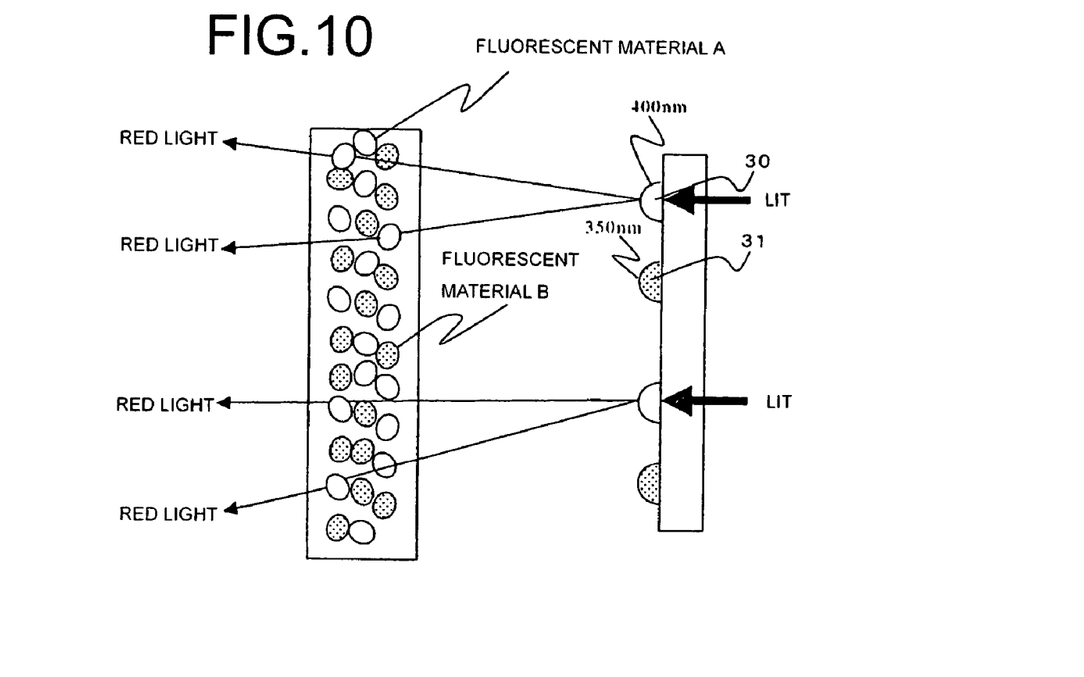
FIG. 10 schematically illustrates the relation among the region that contains different fluorescent materials inside the lamp cover, the arrangement of light sources, and the emission colors (red light and amber light) when one type of light sources are lit in the rear combination lamp of the second embodiment of the present invention.
Figure 11:
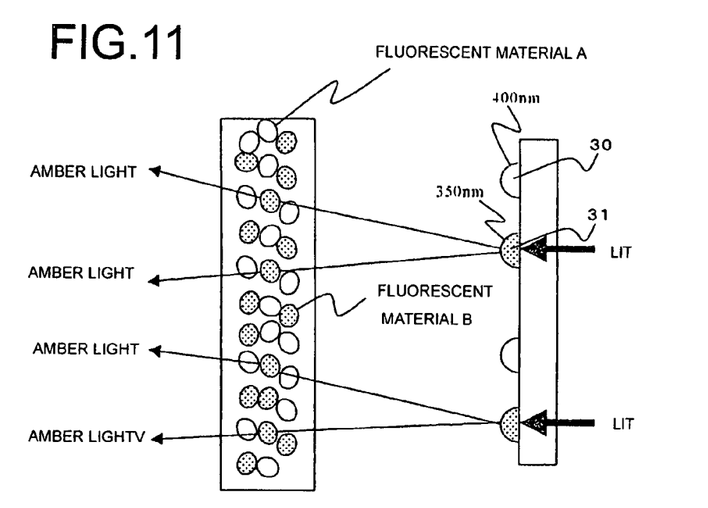
FIG. 11 schematically illustrates the relation among the region that contains different fluorescent materials inside the lamp cover, the arrangement of light sources, and the emission colors (red light and amber light) when the other type of light sources are lit in the rear combination lamp of the second embodiment of the present invention.

The relation between the lamp cover and the light sources will now be described below in detail. FIGS. 9 to 11 illustrate schematically the relation, in the rear combination lamp of the second embodiment of the present invention, among the region(s) that contain the fluorescent material inside the lamp cover, the arrangement of the light sources, and the colors of the emitted lights.

As shown in FIG. 9, in the rear combination lamp of the second embodiment, a mixture of red light emitting fluorescent material A and amber light emitting fluorescent material B is provided in (or blended in) the region of the lamp cover 20 that corresponds to the lamp chamber 62. Also, the light sources 30, which emit light that has a main wavelength peak of 400 nm and effectively excites fluorescent material A, and the light sources 31, which emit light that has a main wavelength peak of 350 nm and effectively excites fluorescent material B, are disposed inside the lamp chamber 62.

The specific compositions of the fluorescent materials used in the second embodiment are the same as those in the first embodiment, and the descriptions thereof are therefore omitted.

In the rear combination lamp 101 with fluorescent material of the same composition as in the first embodiment provided in (blended into) the lamp cover 20 of the above configuration, the whole surface of the lamp cover 20 emits red light when only the light sources 30 are lit as FIG. 10 shows. When on the other hand only the light sources 31 are lit, the whole surface of the lamp cover 20 emits amber light as FIG. 11 shows.

However, because the entire surface of the lamp cover 20 emits light as described above, it is not possible, by simultaneously lighting the light sources 30 and 31, to cause both red and amber light to be emitted. Thus, although the rear combination lamp 101 of this embodiment has the advantage that the visibility is further enhanced compared to the first embodiment because each color is emitted extensively through the whole surface of the lamp cover 20, it also has the disadvantage that lighting and extinguishing (or lighting on and off) of red and amber colors cannot be controlled independently (red and amber lights cannot be simultaneously emitted in a distinguishable manner). Measures for resolving this will be described with reference to FIGS. 12 and 13.

The ultraviolet ray absorbing coating 70 can be coated on the outer surface of the lamp cover 20 in the same way as shown in FIG. 5.

With the rear combination lamp 101 of the second embodiment, it is not possible for red and amber lights to be emitted simultaneously in a distinguishable manner. However, this can be resolved by adding, in either the upper or the lower section, a lamp chamber that is able to emit either red or amber light.

Figure 12:
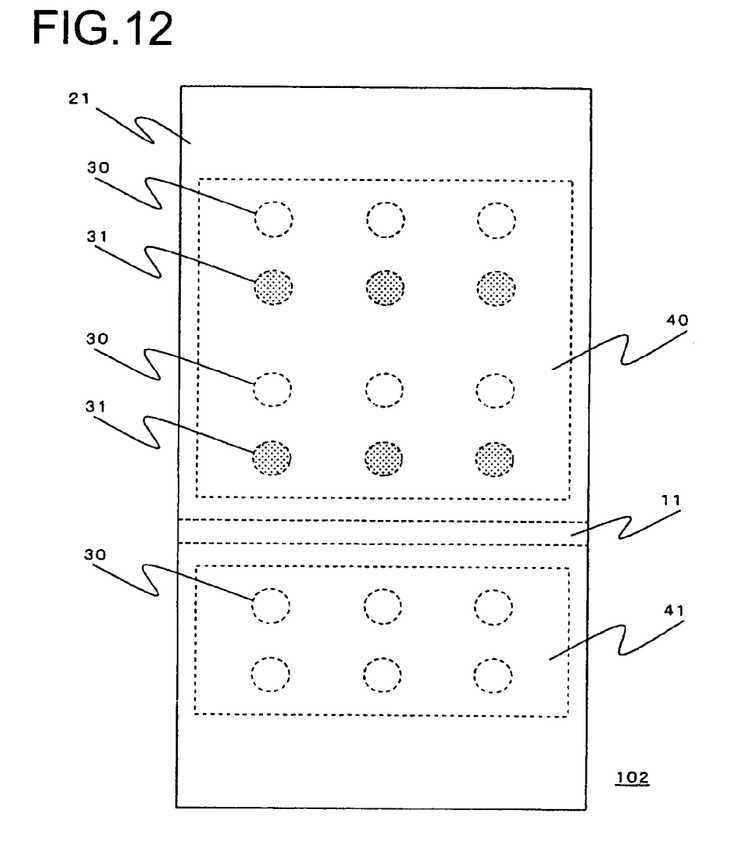
FIG. 12 is a schematic front view of the rear combination lamp according to another type of rear combination lamp of the second embodiment of the present invention.
Figure 13:
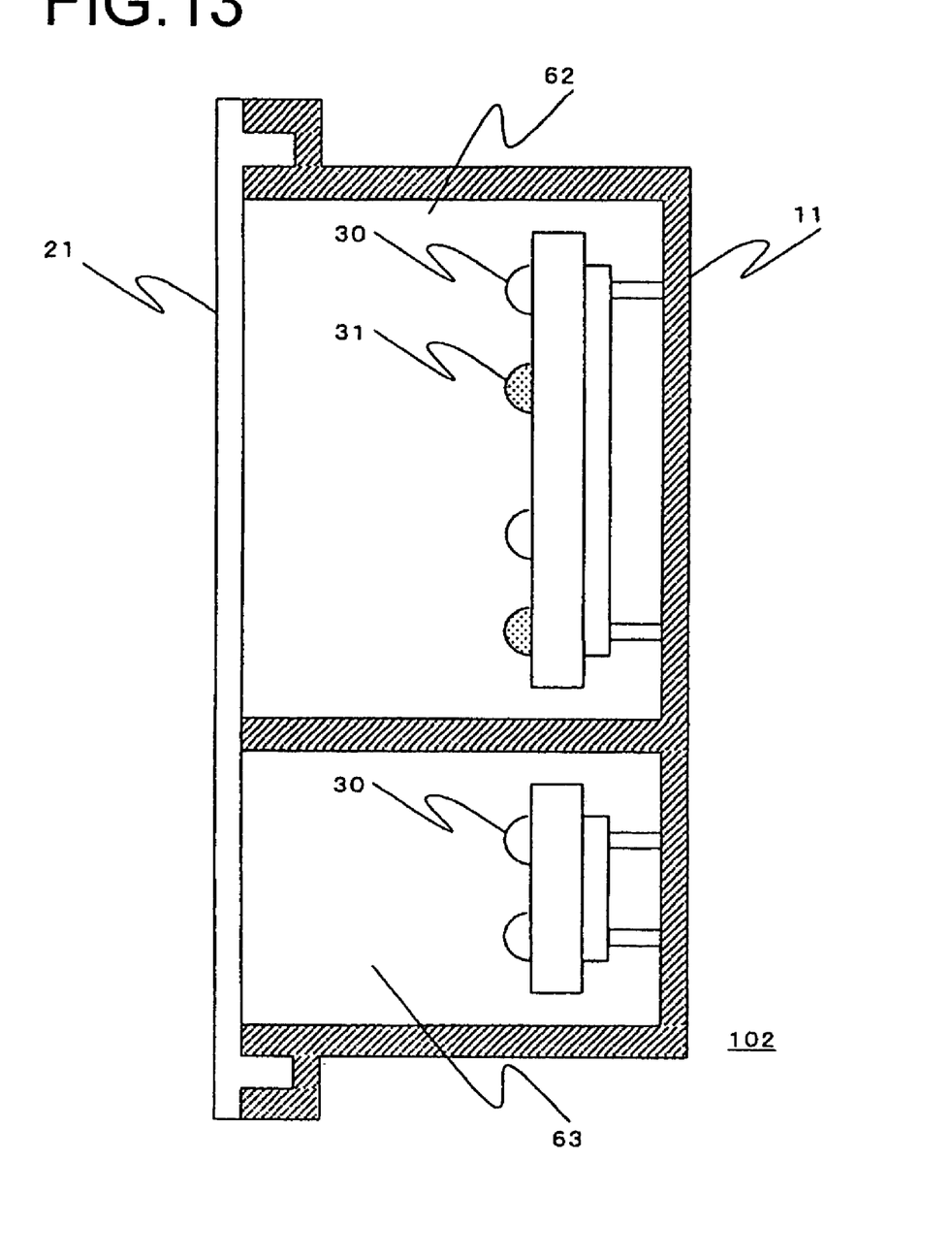
FIG. 13 is a schematic longitudinal cross-sectional view thereof.

FIG. 12 is a schematic view (front view) of the configuration of an improved version of the rear combination lamp of the second embodiment of the present invention. FIG. 13 is a longitudinal cross-sectional view thereof.

As best seen from FIG. 13, the rear combination lamp 102 has a structure that a lamp chamber 63 is added to the bottom of the rear combination lamp 101 shown in FIG. 10, and light sources 30, which emit light that has a main wavelength peak of 400 nm and effectively excites the fluorescent material A, are disposed inside the lamp chamber 63. In addition, fluorescent material A, which emits red light, is provided in a region of a lamp cover 21 that corresponds to the lamp chamber 63. The lamp cover 21 is formed so that it covers the upper and lower lamp chambers 62 and 63.

Figure 14:
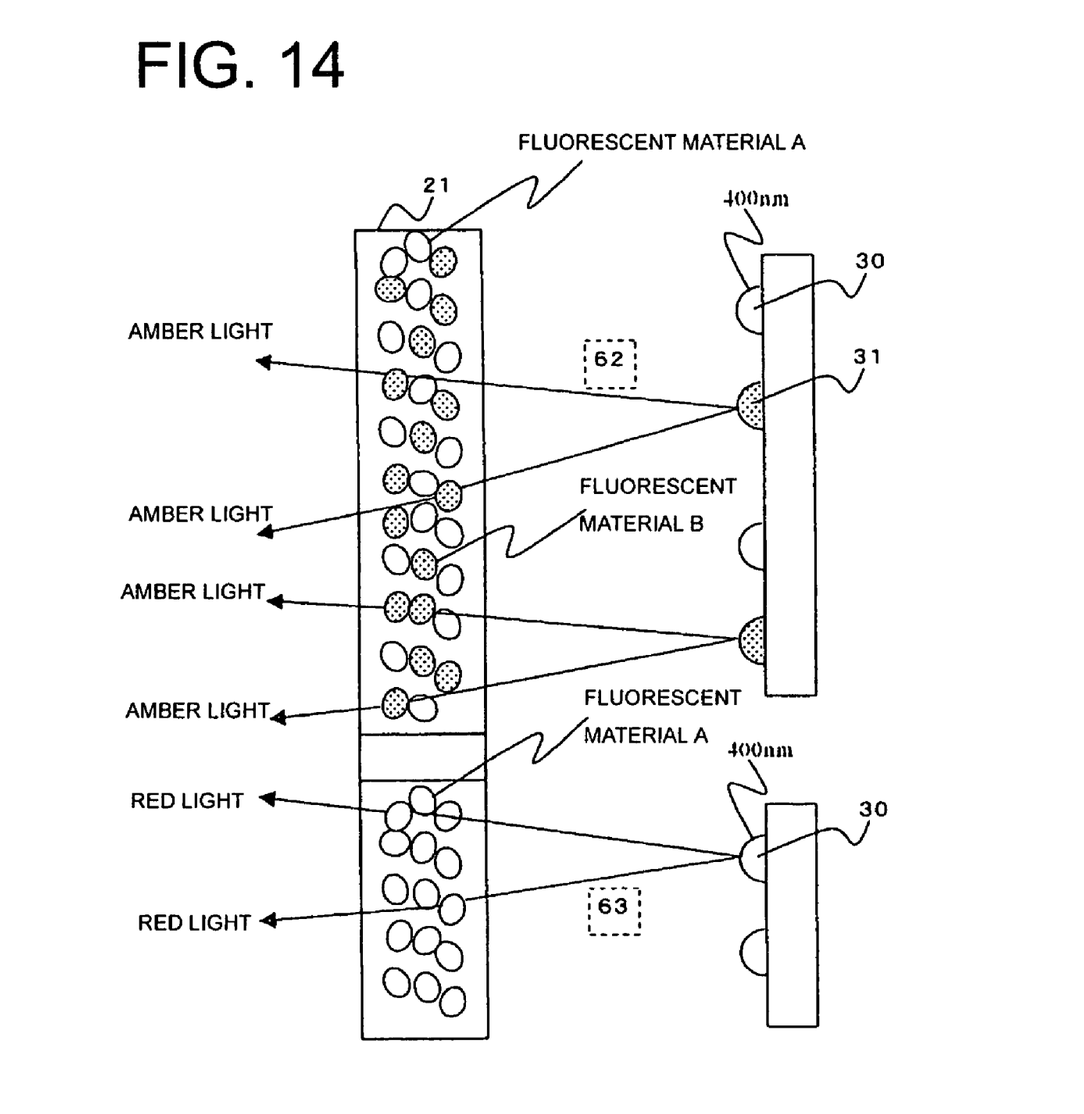
FIG. 14 schematically illustrates the relation among the region that contains different fluorescent materials inside the lamp cover, the arrangement of light sources, and the emission colors (red light and amber light) in another type of rear combination lamp of the first embodiment of the present invention.

In the rear combination lamp 102 in which the fluorescent material of the same composition as in the first embodiment is provided in the lamp cover 21, when both red and amber lights are to emitted, lights of separate colors are emitted in the light chambers 62 and 63. For instance, when the light sources 31 of the light chamber 62 and the light sources 30 of the light chamber 63 are lit simultaneously, the upper section of the lamp cover 21 emits amber light and the lower section red light as shown in FIG. 14. Accordingly, it is possible to have red and amber emitted simultaneously in a distinguishable manner. Also, if the light sources 30 of the light chamber 62 and the light sources 30 of the lamp chamber 63 are lit simultaneously so as to have only red light emitted, the area through which the red light is emitted is enlarged, and the visibility of the lamp is further enhanced.

As seen from the above, according to the vehicular marker lamp of the second embodiment, thanks to the appropriate combination of light sources with fluorescent materials that are provided in the lamp cover, it is possible to accurately distinguish between the state that colored light is emitted when the lamp is lit and the state that the lamp is colorless when the lamp is not lit or the sunlight is being reflected. Thus, the visibility of the lump further improves.

In the embodiments of the present invention, a commonly known method can be used for providing the fluorescent material in the particular region(s) in the lamp cover.

The invention claimed is:

1. A vehicular marker lamp comprising:
   a housing having an open end in a direction of light irradiation, said housing for mounting in a motor vehicle;
   a lamp cover made of a colorless transparent material that contains nanosized fluorescent material therein, said lamp cover covering said open end of said housing; and
   light sources that excite the fluorescent material so as to cause the lamp cover to emit colored light; and wherein
   the lamp cover has an ultraviolet ray absorbing coating layer provided on an outside surface of said lamp cover; and
   the average particle size of the florescent material is 100 nm or smaller.

2. The vehicular marker lamp according to claim 1, wherein the lamp cover contains at least two types of fluorescent material, and moreover includes regions in which each type of fluorescent material is separately contained, the light sources being disposed inside a lamp chamber that is formed to be partitioned so as to include such regions individually.

3. The vehicular marker lamp according to claim 1 or 2, wherein the light sources emit light of differing characteristic wavelengths.

4. The vehicular marker lamp according to claim 3, wherein the lamp cover includes a region in which a mix of the at least two fluorescent materials is contained, and the light sources are disposed inside a lamp chamber that is formed so as to include the whole of such region.

* * * * *